United States Patent [19]

Caulfield

[11] Patent Number: 4,700,485
[45] Date of Patent: Oct. 20, 1987

[54] LINEAR MEASURING DEVICE

[75] Inventor: Leonard Caulfield, Van Wert, Ohio

[73] Assignee: Teleflex Incorporated, Limerick, Pa.

[21] Appl. No.: 838,171

[22] Filed: Mar. 10, 1986

[51] Int. Cl.⁴ .............................................. G01B 7/02
[52] U.S. Cl. .............................. 33/143 L; 33/125 R;
33/147 E; 33/147 N
[58] Field of Search ............. 33/143 L, 147 E, 125 R,
33/125 A, 147 F, 147 N

[56] References Cited

U.S. PATENT DOCUMENTS

| | | | |
|---|---|---|---|
| 3,535,793 | 10/1970 | Williams et al. | 33/125 A |
| 3,851,396 | 12/1974 | Klabunde | 33/147 E |
| 4,136,455 | 1/1979 | Owsen | 33/147 F |
| 4,567,663 | 2/1986 | Gillespie | 33/143 L |

*Primary Examiner*—Willis Little
*Attorney, Agent, or Firm*—Reising, Ethington, Barnard, Perry & Milton

[57] ABSTRACT

A linear measuring device (10) and method for measuring the length of an element along an axis thereof includes a shaft (12). A first end block (14) supports one end of the shaft (12) and a second end block (16) supports the other end of the shaft (12) in spaced relationship to a support surface. A linear scale (18) interconnects the end blocks (14, 16) along the length of the shaft (12). A slideable block (26) is supported by the shaft (12) for moving along the length of the shaft (12) to measure the length of the element with respect to the first end block (14). A detector head (82) and display counter (84) provide a linear displacement of the slideable block (26) measured along the linear scale (24).

43 Claims, 6 Drawing Figures

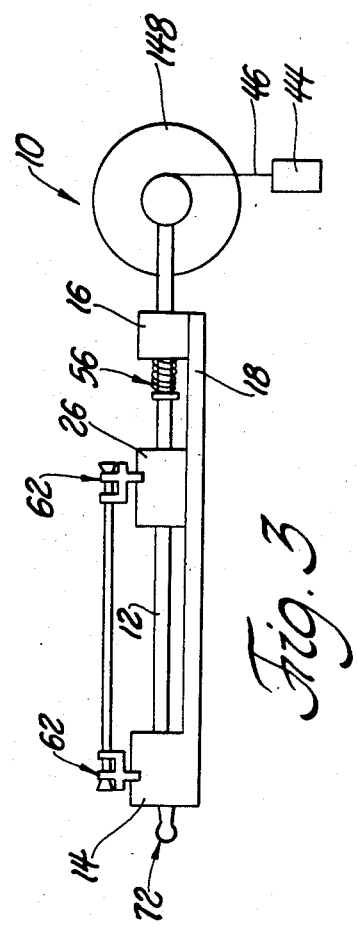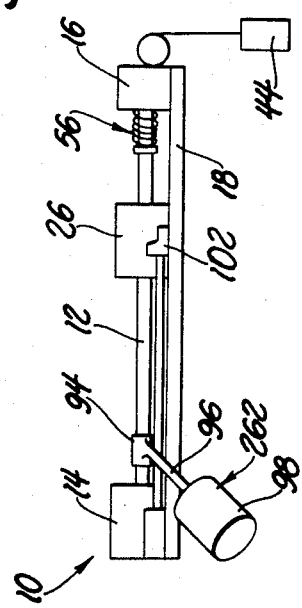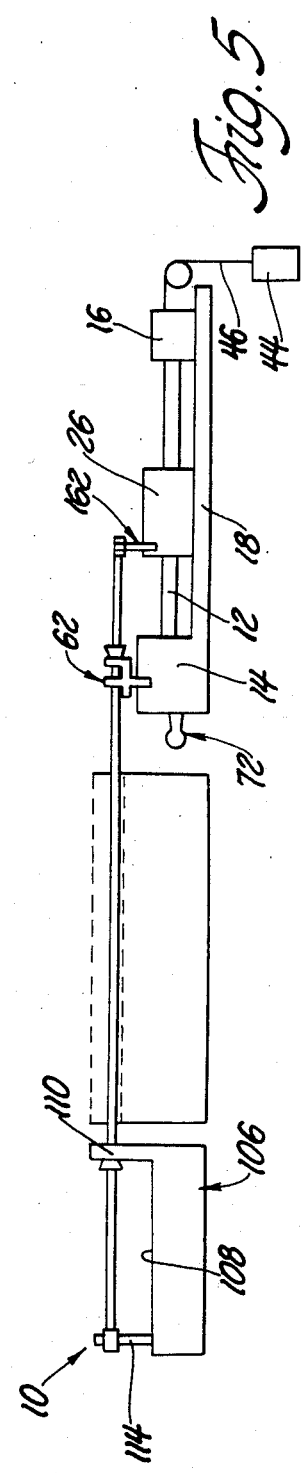

LINEAR MEASURING DEVICE

The invention relates to a device for measuring the length of an element and, particularly, a linear measuring device for measuring push-pull cable assemblies.

BACKGROUND ART

Frequently, it is desired to measure the linear length of an element such as a push-pull cable assembly. This has been accomplished in the past by a caliper-type device which may include one or both ends to be extended outwardly. These devices typically utilize a mechanical scale for providing the most significant figures and an electrical circuit for the least significant figures to present a composite reading as disclosed in U.S. Pat. No. 4,063,362 in the name of Amsbury et al.

The problem with these devices is that the element must be manually held between the calipers while making a measurement. Also, a single direct linear measurement of the element cannot be provided but must be computed from two different sources. Further, these devices do not give a direct readout of the measurement.

STATEMENT OF INVENTION AND ADVANTAGES

A linear measuring device and method for measuring the length of an element along an axis thereof includes a shaft. A first support means supports one end of the shaft and a second support means supports the other end of the shaft in spaced relationship to a support surface. A linear scale interconnects the support means along the length of the shaft. A movable means in supported by the shaft for moving along the length of the shaft to measure the length of the element with respect to the first support means. A detector means provides a linear displacement of the movable means measured along the linear scale.

A preferred method for measuring the length of an element along an axis thereof includes attaching one end of the element to a first support means and attaching the other end of the element to a movable means. The movable means is moved linearly away from the first support means along the linear scale to place the element in tension. The position of the movable means is detected along the linear scale.

Accordingly, the subject invention does not require the operator to manually hold the element to be measured. Also, the subject invention provides a direct digital linear readout of the length of the object. Further, the readout is a single measurement of the length of the element that requires no computation.

FIGURES IN THE DRAWINGS

Other advantages of the present invention will be readily appreciated as the same becomes better understood by reference to the following detailed description when considered in connection with the accompanying drawings wherein:

FIG. 3 is a partial broken view of the subject invention taken substantially along line 3—3 of FIG. 1;

FIG. 4 is an elevational view of the subject invention;

FIG. 5 is an elevational view of a first alternate embodiment of the subject invention.

DESCRIPTION OF THE PREFERRED EMBODIMENT

Figure 1:
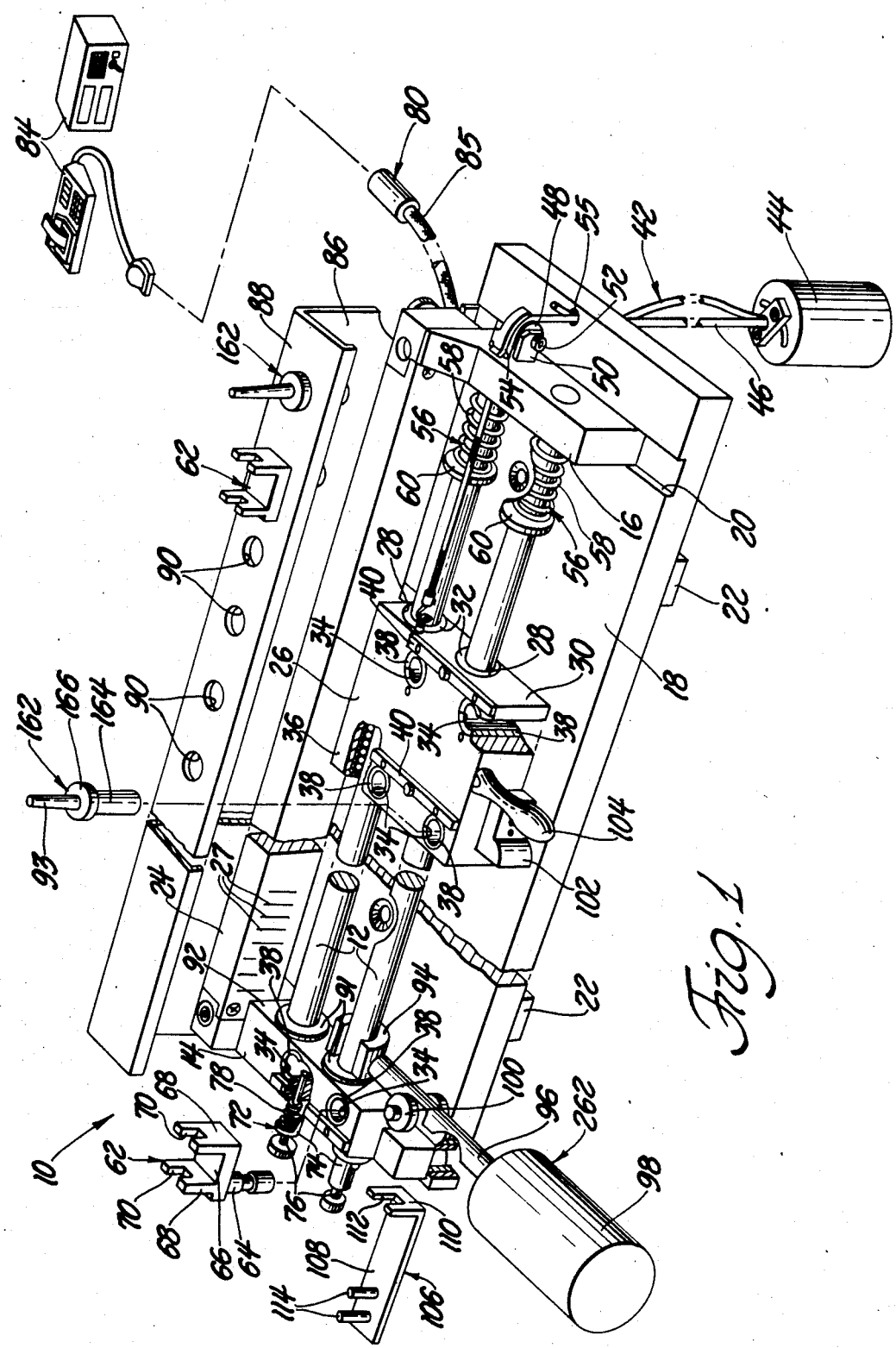
FIG. 1 is a perspective view of the subject invention.

A linear measuring gauge or device for measuring the length of an element along an axis thereof is generally shown at 10 in FIG. 1. The device 10 comprises at least one, and preferably a plurality of, shaft 12 being circular in transverse cross section. The shaft 12 is supported at one end by a first support means 14 and the other end of the shaft 12 is supported by a second support means 16. In other words, the shaft 12 is supported by and interconnects the first 14 and second 16 support means.

The first support means 14 comprises a first end block 14 connected to and supporting one end of the shafts 12. The second support means 16 comprises a second end block 16 connected to and supporting the other end of the shafts 12. The end blocks 14,16 are rectangular in shape, but may have any other geometrical configuration. A planar table 18 is substantially parallel to a support surface and supports the end blocks 14,16. Said another way, a planar table 18 is substantially parallel to a substantially flat support surface for supporting the end blocks 14,16 upon the planar table 18. The end blocks 14,16 are disposed in rectangular grooves 20 perpendicular to the longitudinal length of the planar table 18. The planar table 18 also includes legs 22 for supporting the table 18 in spaced relationship to the support surface.

A linear scale 24 is disposed along the length of the shafts 12 and also interconnects the first 14 and second 16 support means. Said another way, the linear scale 24 is parallel to the shaft 12 and interconnects the first 14 and second 16 support means. The linear scale interconnects the end blocks 14,16 and is supported in spaced relationship to the planar table 18. In other words, the linear scale 24 preferably does not rest or contact the planar table 18. The linear scale 24 includes indexed graduations 27 equidistantly along the longitudinal length of the linear scale 24.

The device 10 includes a movable means 26 supported by the shafts 12 for moving along the length of the shafts 12 to measure the length of the element with respect to the first support means 14. The movable means 26 comprises a rectangular shaped slideable block 26 supported by the shafts 12 to slide along the shafts 12 between the first 14 and second 16 end blocks. The slideable block 26 includes at least one aperture 28 diametrically communicating through the slideable block 26. Preferably, the slideable block 26 has a plurality of apertures 28, i.e., one aperture 28 of the slideable block 26. Said another way, the slideable block 26 may be supported by any suitable means to slide on top of the shaft 12 or, as in the preferred embodiment, having a pair of shafts 12 parallel to one another communicating through the ends 30 of the slideable block 26 to move along the shafts 12. The aperture 28 includes a tubular sleeve 32, but may be a hole or aperture 28 in the slideable block 26 without a sleeve 32.

The slideable block 26 and the first end block 14 include at least one, preferably a plurality of, bores 34 disposed in the upper surface 36 of the slideable block 26 and the first end block 14. The bores 34 include a tubular sleeve 38. In other words, the bore 34 include a tubular sleeve 38 disposed perpendicularly to the upper surface 36 in the slideable block 26 and the first end block 14 and perpendicularly to the shafts 12. The slideable block 26 includes a dual pair of bores 34. One pair of bores 34 are disposed near one end 30 and another pair at the opposite end 30 of the slideable block 26. A locating member 40 is secured behind the bores 34 with respect to the first end block 14. The dual pair of bores 34 on the slideable block 26 are provided for adjustability of various lengths of elements to be measured.

The device 10 further includes a displacement means, generally indicated at 42, connected to the movable means 26 for displacing the movable means 26 along the shafts 12. The displacement means 42 comprises a weighted member 44 and a cable 46 interconnecting the slideable block 26 and the weighted member 44. A pulley 48 is secured to the second end block 16 between a pair of support members 50 by a fastening means 52. The cable 46 communicates with the pulley 48. Said another way, one end of the cable 46 is connected to the slideable block 26, and the cable 46 communicates through an aperture 54 in the second end block 16 and rides in the "V" of the pulley 48 and the weighted member 44 is connected to the other end of the cable 46. Also, the cable 46 communicates through a hole 55 in the planar table 18. Hence, the weighted member 44 is dropped and continues to fall due to gravity, which in turn, pulls the cable 46 to move the slideable block 26.

The device 10 also includes a bumper means, generally indicated at 56, interconnecting the slideable block 26 and the second end block 16 for preventing the slideable block 26 from contacting the second end block 16. The bumper means 56 comprises a spring 58 disposed about and along the length of the shaft 12 and a washer member 60 connected at one end of the spring 58. In other words, both the spring 58 and washer member 60 are disposed about the shaft 12 to prevent the slideable block 26 from contacting the second end block 16 as the slideable block 26 is being displaced toward the second end block 16.

The device 10 further includes a retaining means, generally indicated at 62, attached to the first support means 14 and the movable means 26 for retaining one end of the element to the first support means 14 and the other end of the element to the movable means 26. The retaining means 62 includes a shaft member 64 disposed in the bore 34 of the first end block 14 and the slideable block 26. Said another way, the shaft member 64 of the retaining means 62 is disposed in bore 34 of the first end block 14 and slideable block 26 to retain one end of the element to the first end block 14 and the other end of the element to the slideable block 26. The retaining means 62 comprises a base portion 66 connected to the shaft member 64 having end walls 68 extending vertically upwardly and outwardly from the base portion 66 and having a slot 70 in the end walls 68. In other words, the shaft member 64 is perpendicular to and connected to the bottom of the base portion 66 and having a slot 70 in the end walls 68. In other words, the shaft member 64 is perpendicualr to and connected to the bottom of the base portion 66 and the end walls 68 are perpendicular to and connected to the top of the base portion 66. One end wall 68 is connected at one end of the base portion 66 and the other end wall 68 is connected at the other end of the base portion 66. The slot 70 in the end walls 68 retains the element to the retaining means 62.

The device 10 further includes a locking means, generally indicated at 72, attached to the first end block 14 for securing the retaining means 62 to the first end block 14. The locking means 72 secures the shaft member 64 of the retaining means 62 in the bores 34 of the first end block 14. The locking means 72 includes a housing 74 connected to the first end block 14 and a plunger 76 communicating through the housing 74 and a biasing means 78 disposed within the housing 74 and about the plunger 76 for biasing the plunger 76 in the bore 38 for a locking position. The biasing means 78 comprises a spring 78 disposed about the shaft of the plunger 76. In other words, the spring 78 is disposed within the housing 74 and about the plunger 76. The plunger 76 communicates through the housing 74 and first end block 14 and bore 37 of the first end block 14. The shaft member 64 may include a groove 79 coacting with the plunger 76 to receive the retaining means 62 in the bore 34. Hence, the plunger 76 is pulled outward for unlocking and biased by the spring 78 for locking.

Figure 6:
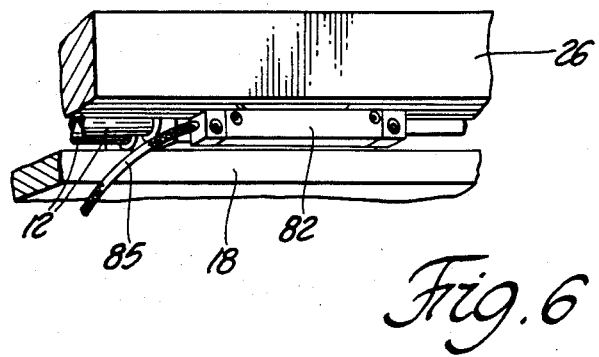
FIG. 6 is an elevational view of a second alternate embodiment of the subject invention.

The device 10 further includes a detector means 80 for providing the linear displacement of the movable means 26 measured along the linear scale 24. In other words, the movable means 26 moves along the shaft 12 with respect to a fixed reference being the first support means 14 and the detector means 80 provides the linear displacement of the movable means 26 with respect to the first support means 14. The detector means 80 comprises a sensor means 82 (FIG. 6) mounted on the movable means 26 for sensing the displacement of the movable means 26 along the linear scale 24 to provide digital information as to the displacement of the movable means 26 and indicating means 84 for indicating the linear displacement of the movable means 26 along the shaft 12 by the digital information from the sensor means 82. The sensor means 82 comprises a detector head 82 mounted on the slideable block 26 to detect or count the graduations 27 along the linear scale 24. The indicating means 84 comprises a display counter 84 to indicate the linear displacement. The indicating means 84 includes a coaxial cable 85 interconnecting the detector head 82 and the display counter 84 to transport the digital data to the display counter 84. In other words, the detector heads 82 counts the distance along the scale 24 by the graduations 27 and feeds the binary coded decimal information from the linear scale 24 to the counter 84 via the cable 85.

The device 10 further includes a rack 86 connected to the planar table 18 having an L-shaped configuration. The flat portion 88 or the bottom of the "L" includes a series of holes 90 along the length of the rack 86. The shaft member 64 of the retaining means 62 may be disposed in the hole 90 to store the retaining means 62.

The device 10 also includes offset members 91 comprising washer disposed about the shafts 12 and connected to the first end block 14. Said another way, the face 92 of the first end block 14 is a "zero" reference. The offset members 91 provide an offset when the slideable block 26 is pulled against the face 92. This offset can be subtracted internally from the length readings on the counter 84 during the set up of the counter 84, i.e., during calibration.

A first alternate embodiment of the retaining means is generally indicated at 162. The retaining means 162 includes a shaft member 164 removable disposed in the bores 34 of the first end block 14 and the movable means 26. The retaining means 162 comprises a base portion 166 having a circular configuration connected to the shaft member 164 and a frustoconical portion 93 extending vertically upwardly and outwardly from the base portion 166.

A first alternate embodiment of the device 10 includes retaining means generally indicated at 262. The retaining means 262 comprises a hemicylindrical tubular member 94 disposed between the shaft 12 and the planar table 18 and a rod 96 perpendicular to the shaft 12 having one end connected to the hemicylindrical member 94 and the other end to a weighted element 98. The weighted element 98 is rotated upwardly and downwardly about the shaft 12 by the member 94. One end of the element to be measured is secured between the rod 96 and the planar table 18 by the weight of the weighted element 98. The retaining means 262 includes an adjustment means 100 comprising a fastener 100 disposed through the rod 96 to allow for the height adjustment of the rod 96 with respect to the table 18. Said another way, the adjustment means 100 prevents the rod 96 from contacting the table 18 and allows for the spaced relationship of the rod 96 with respect to the table 18 to accommodate various thicknesses of elements to be measured.

Further, a stop member 102 is connected on the side of the slideable block 26 to which one end of the element is manually secured for displacement of the slideable block 26 along the shafts 12. The stop member 102 has an L-shape. A handle 104 is connected to the slideable block 26 to manually displace the slideable block 26 along the shafts 12. In other words, one end of the element is secured by the retaining means 262 and the other end is manually held by the operator's hand to the stop member 102, and the handle 104 of the slideable block 26 is manually moved or displaced, which in turn, displaces the slideable block 26 along the shafts 12 to measure the length of the element.

Figure 2:
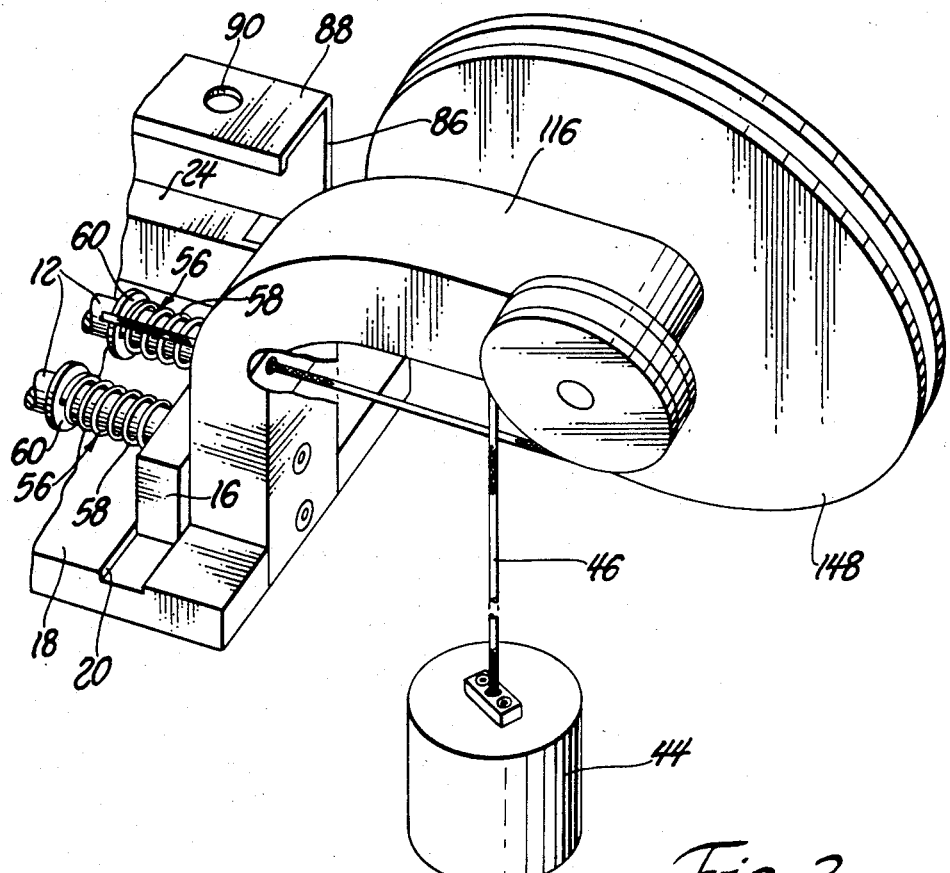
FIG. 2 is a partial view of an alternate embodiment of the subject invention.

As a second alternate embodiment, the device 10 includes an extension means generally indicated at 106 remotely attached to the support surface for retaining one end of the element. The extension means 106 comprises a base member 108 having an end wall 110 extending vertically upwardly and outwardly at one end of the base member 108 and having a slot 112 in the end wall and dowel members 114 extending vertically upwardly from the base member 108 as illustrated in FIG. 2. An L-shaped arm member 116 is connected to planar table 18 and a differential pulley 148 connected to the arm member 116. The cable 46 communicates with differential pulley 148. In other words, the differential pulley 148 and extension means 106 allows longer element lengths to be measured and provides a shorter distance in which the weighted member 44 falls.

In accordance with the subject invention, there is provided a method for linearly measuring the length of an element along an axis thereof including the steps of attaching one end of the element to a first support means 14 and attaching the other end of the element to a movable means 26 as illustrated in FIGS. 3, 4, and 5. The steps include moving the movable means 26 linearly away from the first support means 14 along the linear scale 24 to place the element in tension. Further, the steps include detecting the position of the movable means 26 along the linear scale 24. The steps include mounting the movable means 26 on a shaft 12 suspended between a first 14 and second 16 support means. The step of detecting is performed by sensing the displacement of the movable means 26 along the linear scale 24 and providing digital information responsive to the displacement of the movable means 26 and indicating the linear displacement of the movable means 26 along the shaft 12 from the digital information.

The method further includes the step of sensing by disposing indexed graduations 26 equidistantly along the length of the scale 24 and disposing a detector head 82 on the movable means 26 and detecting the graduations 27 along the scale 24. The steps include connecting a cable 46 to the movable means 26 and placing a weighted element 44 on the other end of the cable 46. The step of moving the movable means 26 is performed by dropping the weighted element 44 and pulling the cable 46 taut and moving the movable means 26 along the shaft 12 to measure the length of the element.

The step of attaching is performed by disposing a retaining means 62,162 in a bore 34 in the first support means 14 and the movable means 26. The step includes securing the one end of the element in the retaining means 62,162 in the first support means 14 and securing the other end of the element in the retaining means 62,162 in the movable means 26. Alternatively, the attaching may be performed by securing one end of the element between a rod 96 having a weighted element 98 and a planar table 18 and manually retaining the other end of the element to the movable means 26. The step of moving the movable means 26 may be performed by manually moving the movable means 26 along the shaft 12. The steps include locking the retaining means 62,162 in the first support menas 14. The steps include disposing a bumper means 56 between the movable means 26 and the second support means 16 and preventing the movable means 26 from contacting the second support means 16. The steps further include supporting the support means 14,16 on the planar table 18 on a support surface. Alternatively, the step of attaching may include disposing an extension means 106 remotely to the support surface and retaining one end of the object to the extension means 106.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A linear measuring device (10) for measuring the length of an element along an axis thereof, said device (10) comprising; a shaft (12), a first support means (14) for supporting one end of said shaft (12) and a second support means (16) for supporting the other end of said shaft (12) in spaced relationship to a support surface, a linear scale (24) along the length of said shaft (12) and interconnecting said support means (14,16), retaining means (62,162) attached to said first support means (14) and said movable means (26) for retaining one end of the element to said first support means (14) and the other end of the element to said movable means (26), and characterized by a movable means 26 supported by said shaft (12) for moving along the length of said shaft (12) to measure the length of the element with respect to said first support means (14) and detector means (80) for providing the linear displacement of said movable means (26) measured along said linear scale (24).

2. A device as set forth in claim 1 further characterized by said detector means (80) including sensor means (82) mounted on said movable means (26) for sensing the displacement of said movable means (26) along said scale (24) to provide digital information as to the displacement of said movable means (26) and indicating means (84) for indicating the linear displacement of said movable means (26) along said shaft (12) by the digital information from said sensor means (82).

3. A device as set forth in claim 2 including displacement means (42) connected to said movable means (26) for displacing said movable means (26) along said shaft (12).

4. A device as set forth in claim 3 wherein said first support means (14) includes a first end block (14) connected to and supporting one end of said shaft (12) and said second support means (16) includes a second end block (16) connected to and supporting the other end of said shaft (12).

5. A device as set forth in claim 4 wherein said scale (24) interconnects said end blocks (14,16) and has indexed graduations (27) equidistantly along the length of said scale (24).

6. A device as set forth in claim 5 wherein said moveable means (26) includes a slideable block (26) supported by said shaft (12) to slide along said shaft (12) between said first (14) and second (16) end blocks.

7. A device as set forth in claim 6 wherein said sensor means (82) includes a detector head (82) mounted on said slideable block (26) to detect said graduations (27) along said scale (24).

8. A device as set forth in claim 7 wherein said indicating means (84) includes a display counter (84) to indicate the linear displacement and a cable 85 interconnecting said sensing means (82) and said display counter (84) for transporting the digital data to said display counter (84).

9. A device as set forth in claim 8 wherein said slideable block (26) has at least one aperture (28) diamtrically communicating through said slideable block (26), said shaft (12) disposed in and communicating through said aperture (28) of said slideable block (26).

10. A device as set forth in claim 9 including a planar table (18) substantially parallel to the support surface and supporting said end blocks (14,16).

11. A linear measuring device (10) for measuring the length of an element along an axis thereof, said device (10) comprising: a shaft (12), a first support means (14) for supporting one end of said shaft (12) and a second support means (16) for supporting the other end of said shaft (12) in spaced relationship to a support surface, a linear scale (24) along the length of said shaft (12) and interconnecting said support means (14,16), retaining means (62,162) attached to said first support means (14) and said movable means (26) for retaining one end of the element to said first support means (14) and the other end of the element to said movable means (26), and further characterized by said first end block (14) and said slideable block (26) including at least one bore (34) to secure said retaining means (62,162) in said first end block (14) and said slideable block (26).

12. A device as set forth in claim 11 including displacement means (42) connected to said movable means (26) for displacing said movable means (26) along said shaft (12).

13. A device as set forth in claim 12 including locking means (72) attached to said first end block (14) for securing said retaining means (62,162) to said first end block (14).

14. A device as set forth in claim 13 wherein said retaining means (62,162) includes a shaft member (64,164) disposed in said bore (34).

15. A device as set forth in claim 14 wherein said locking means (72) includes a housing (74) connected to said first end block (14), a plunger (76) communicating through said housing (74) and biasing means (78) disposed within said housing (74) and about said plunger (76) for biasing said plunger in said bore (34) for a locking position.

16. A device as set forth in claim 15 wherein said retaining means (62) comprises a base portion (66) connected to said shaft member (64), end walls (68) extending vertically upwardly and outwardly from said base portion (66), and a slot (70) in said end walls (68).

17. A device as set forth in claim 15 wherein said retaining means (162) comprises a base portion (166) connected to said shaft member (64) and a frustoconical portion (93) extending vertically upwardly and outwardly from said base portion (166).

18. A device as set forth in claim 15 wherein said displacement means (42) includes a weighted element (44) and a cable (46) interconnecting said slideable block (26) and said weighted element (44).

19. A device as set forth in claim 18 including bumper means (56) interconnecting said slideable block (26) and said second end block (16) for preventing said slideable block (26) from contacting said second end block (16).

20. A device as set forth in claim 19 wherein said bumper means (56) includes a spring (58) disposed along the length of said shaft (12).

21. A device as set forth in claim 20 including a pulley (48) connected to said second end block (16), said cable (46) communicating with said pulley (48).

22. A device as set forth in claim 18 wherein said slideable block (26) includes a handle (104) connected to said slideable block to manually displace said slideable block (26) along said shaft (12).

23. A device as set forth in claim 22 wherein said slideable block (26) includes a stop member (102) to which one end of the object is manually secured for displacement along said shaft (12).

24. A device as set forth in claim 23 including a retaining means (262) comprising a rod (96) perpendicular to said shaft (12), a hemicylindrical member (94) connected to one end of said rod (96) and pivotal about said shaft (12), and a weighted element (98) at the other end of said rod (96).

25. A device as set forth in claim 18 including an extension means (106) remotely attached to the support surface for retaining one end of the element.

26. A device as set forth in claim 25 wherein said extension means (106) comprises a base member (108) having an end wall (110) extending vertically upwardly and outwardly at one end of said base member (108) and having a slot (112) in said end wall (110) and dowel members (114) extending vertically upwardly from said base member (108).

27. A device as set forth in claims 20 or 26 including an arm member (116) connected to a planar table (18) and a differential pulley (116) connected to said arm member (116), said cable (46) communicating with said differential pulley (116).

28. A device as set forth in claim 18, 21 or 26 including a rack (86) connected to said table (18) and having an L-shaped configuration and bores (90) along the length of said rack (86).

29. A device as set forth in claims 18, 21 or 26 including a plurality of said shafts (12).

30. A device as set forth in claims 18, 21 or 26 wherein said first end block (14) and said slideable block (26) include a plurality of said bores (34).

31. A device as set forth in claims 18, 21 or 26 including offset members (91) disposed about and along said shaft (12) and connected to said first end block (14) between said first end block (14) and said slideable block (26).

32. A method for linearly measuring the length of an object along an axis thereof, said method comprising the steps of attaching one end of disposing a retaining means (62,162) in a first support means (14) and locking the retaining means (62,162) in said first support means (14); disposing a second retaining means (62,162) in a movable means (26); an element to the retaining means in said support means (14); attaching the other end of the element to the second retaining means in said movable means (26) moving the movable means (26) linearly away from the first support means (14) along a linear scale (24) and detecting the position of the movable means (26) along the linear scale (24) to measure the length of the element with respect to the first support means (14).

33. A method as set forth in claim 32 including the step of mounting the movable means (26) on a shaft (12) suspended between the first support means (14) and a second support means (16).

34. A method as set forth in claim 33 further characterized as said detecting by sensing the displacement of the movable means (26) along the scale (24) and providing digital information responsive to the displacement of the movable means (26) and indicating the linear displacement of the movable means (26) along the shaft (12) from the digital information.

35. A method as set forth in claim 34 further characterized as said sensing by disposing indexed graduations (26) equidistantly along the length of the scale (24), disposing a detector head (82) on the movable means (26), and detecting the graduations (27) along the scale (24).

36. A method as set forth in claim 35 including the step of connecting a cable (46) to the movable means (26) and placing a weighted element (44) on the other end of the cable (46).

37. A method as set forth in claim 36 further characterized as said moving of the movable means (26) by dropping the weighted element (44), pulling the cable (46) taut, and moving the movable means (26) along the shaft (12) to measure the length of the element.

38. A method as set forth in claim 35 further characterized as said attaching by manually retaining one end of the element to the movable means (26).

39. A method as set forth in claim 38 further characterized as said moving of the movable means (26) by manually moving the movable means (26) along the shaft (12).

40. A method as set forth in claim 39 including the step of disposing a bumper means (56) between the movable means (26) and the second support means (16) and preventing the movable means (26) from contacting the second support means (16).

41. A method as set forth in claim 39 including the step of supporting the support means (14,16) on a planar table (18) on a support surface.

42. A method as set forth in claim 41 further characterized as said attaching by retaining one end of the object between a rod (96) and the planar table (18).

43. A method as set forth in claims 39 or 42 further characterized as said attaching by disposing an extension means (106) remotely to the support surface and retaining one end of the element to the extension means (106).

* * * * *